US007847658B2

(12) United States Patent
Lyons et al.

(10) Patent No.: US 7,847,658 B2
(45) Date of Patent: Dec. 7, 2010

(54) LIGHT-WEIGHT LOW-THERMAL-EXPANSION POLYMER FOAM FOR RADIOFREQUENCY FILTERING APPLICATIONS

(75) Inventors: Alan Michael Lyons, New Providence, NJ (US); Todd Richard Salamon, Chatham, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 153 days.

(21) Appl. No.: 12/133,259

(22) Filed: Jun. 4, 2008

(65) Prior Publication Data

US 2009/0302974 A1 Dec. 10, 2009

(51) Int. Cl.
*H01P 11/00* (2006.01)
*H01P 1/202* (2006.01)
*H01P 1/205* (2006.01)
(52) U.S. Cl. .................. 333/202; 333/203; 333/206
(58) Field of Classification Search .......... 333/202, 333/203, 206, 207, 208, 209, 227, 228, 229, 333/230, 212; 521/81; 523/513; 525/191
See application file for complete search history.

(56) References Cited

U.S. PATENT DOCUMENTS

| 3,955,161 | A | | 5/1976 | MacTurk |
| 4,216,448 | A | | 8/1980 | Kasuga et al. |
| 4,278,957 | A | | 7/1981 | Starai et al. |
| 4,431,977 | A | | 2/1984 | Sokola et al. |
| 4,980,389 | A | | 12/1990 | Hill et al. |
| 5,317,035 | A | * | 5/1994 | Jacoby et al. ............ 521/143 |
| 5,329,687 | A | | 7/1994 | Scott et al. |
| 5,428,325 | A | | 6/1995 | Jachowski et al. |
| 5,475,040 | A | * | 12/1995 | Jamison et al. ............ 523/513 |
| 5,939,464 | A | * | 8/1999 | Wang ...................... 521/139 |
| 5,963,854 | A | | 10/1999 | Andreasson et al. |
| 6,167,739 | B1 | | 1/2001 | Sipila |
| 6,392,506 | B2 | | 5/2002 | Wulff |
| 6,904,666 | B2 | | 6/2005 | Alford |
| 6,965,515 | B2 | | 11/2005 | Alford et al. |
| 7,179,844 | B2 | | 2/2007 | Aki et al. |
| 2002/0151332 | A1 | | 10/2002 | Eddy |
| 2005/0136876 | A1 | | 6/2005 | Broholm |

FOREIGN PATENT DOCUMENTS

| EP | 0374795 A1 | 6/1990 |
| EP | 0766333 A1 | 4/1997 |
| EP | 1544938 A1 | 6/2005 |

(Continued)

OTHER PUBLICATIONS

PCT Search Report for related case PCT/US2009/003225 dated Aug. 19, 2009; 12 pages.

(Continued)

*Primary Examiner*—Dean O Takaoka
(74) *Attorney, Agent, or Firm*—Hitt Gaines, PC (57) ABSTRACT

An apparatus 100 comprising a radiofrequency filter body housing 102. The radiofrequency filter body housing includes a polymeric composition 110 that includes at least one polymer foam 115 and filler material 120. The filler material is uniformly distributed and randomly oriented throughout the polymeric composition. The radiofrequency filter body housing also includes an electrically conductive material 125 coating the polymeric composition.

19 Claims, 3 Drawing Sheets

FOREIGN PATENT DOCUMENTS

| | | |
|---|---|---|
| EP | 1544940 A1 | 6/2005 |
| EP | 2007027668 | 2/2007 |
| FR | 2829620 A1 | 9/2001 |

OTHER PUBLICATIONS

Database WPI Week 200672 Thomas Scientific, London, GB; AN 2006-692522 XP002539835 & JP 2006246451 A (Kyocera Corp) Sep. 14, 2006, 1 Page.
Database WPI Week 200726 Thomas Scientific, London, GB, AN 2007-271360 XP002539836 & WO 2007007896 A1 (Shojii A) Jan. 18, 2007; 2 Pages.
Database WPI Week 200837 Thomas Scientific, London, GB, AN 2008-F67075 XP002539837 & WO 2008 066585 A (Nippon Shield Enclosure KK) Mar. 21, 2008; 2 Pages.
Database WPI Week 200443 Thomas Scientific, London, GB, AN 2004-454475 XP002539838 & JP 2004-153016 A (Mitsubishi Cable Ind Ltd) May 27, 2004; 2 Pages.
File History of EP Application No. EP 1544940; 72 pages.
Park, Y., et al.; "Failure Analysis of Rapid Prototyped Tooling in Sheet Metal Forming-V-Die Bending"; Transactions of the ASME, vol. 127, Feb. 2005; pp. 116-125.
Erikson, Ray; "Foams on the Cutting Edge"; http://www.memagazine.org/backissues/membersonly/january99/ features/foams/foams.html—website; Jan. 1999; 9 Pages.
Erikson, Ray; "Phases of Foam"; http://www.memagazine.org/backissues/membersonly/january99/features/foams/phases.html—website; The American Society of Mechanical Engineers, 1999;1 Page.
RenShape—"Tooling & High-Temp Work Boards"; Freeman Manufacturing & Supply Co.—www.freemansupply.com; 2006, 4 Pages.
"Qualification Report of Polymer RF Filters"; RFS Whitepapers Article; http://www.rfsworld.com/index.php?p=285&I=1&listName=whitepapers&indexVal=10—website; Nov. 18, 2004; 9 Pages.
"eFunda Polymers: Properties of Polyetherimide"; http://www.efunda.com/materials/polymers/properties/polymer_datasheet.cfm?MajorID=P...; May 23, 2008; 1 Page.
"eFunda Polymers: Properties of Polyurethane"; http://www.efunda.com/materials/polymers/properties/polymer_datasheet.cfm?MajorID=P...; May 23, 2008; 1 Page.
"eFunda Polymers: Properties of Epoxy"; http://www.efunda.com/materials/polymers/properties/polymer_datasheet.cfm?MajorID=e...; May 23, 2008; 1 Page.
"ULTEM Pei Resin"; GE Engineering Thermoplastics; Product Guide; GE Plastics; Entire Guide—May 2003; 52 Pages.
RenShape 5008—"High Performance, Intermediate Temperature Epoxy Board"; RenShape solutions—Huntsman; www.renshape.com; 2006; 3 Pages.
Ultem Resin Dimension Stability; GE Plastics; Oct. 7, 2003; 3 Pages.

* cited by examiner

LIGHT-WEIGHT LOW-THERMAL-EXPANSION POLYMER FOAM FOR RADIOFREQUENCY FILTERING APPLICATIONS

TECHNICAL FIELD OF THE INVENTION

The present disclosure is directed, in general, to an apparatus that comprises a radiofrequency filter and methods of manufacture thereof.

BACKGROUND OF THE INVENTION

Radiofrequency filters often have a number of connected cavities whose shape and dimensions are chosen so as to filter signals in desired frequency ranges (e.g., radiofrequency or microwave frequencies). The body housing of the substrate that defines the cavities is often made of aluminum. Compared to other metals, aluminum has a low density (about 2.7 gm/cm$^3$), low coefficient of thermal expansion (e.g., about $30 \times 10^{-6}$ m/m° C. or about 30 ppm/° C.), and low cost.

SUMMARY OF THE INVENTION

One embodiment is an apparatus comprising a radiofrequency filter body housing. The radiofrequency filter body housing includes a polymeric composition that includes at least one polymer foam and filler material. The filler material is uniformly distributed and randomly oriented throughout the polymeric composition. The radiofrequency filter body housing also includes an electrically conductive material coating the polymeric composition.

Another embodiment is a method of manufacturing an apparatus that comprises forming a radiofrequency filter body housing. Forming the radiofrequency filter body housing includes providing the above-described polymeric composition. Forming the radiofrequency filter body housing also includes forming the polymeric composition into a body housing and coating the body housing with an electrically conductive material.

BRIEF DESCRIPTION OF THE DRAWINGS

The embodiments of the disclosure are best understood from the following detailed description, when read with the accompanying Figures. Corresponding or like numbers or characters indicate corresponding or like structures. Various features may not be drawn to scale and may be arbitrarily increased or reduced in size for clarity of discussion. Reference is now made to the following descriptions taken in conjunction with the accompanying drawings, in which.

DETAILED DESCRIPTION

As radiofrequency filters are incorporated into tower-top electronics, such as wireless filter applications, the weight of aluminum filters becomes a detriment to the ease of installation and service of such electronic devices, and increases the structural load that the tower must support. Additionally, the manufacture of aluminum filters can be expensive and time-consuming.

Embodiments of the disclosure recognize and overcome some problems associated with the replacement of aluminum filter body housings with filter body housings made of polymers. Forming a radiofrequency filter body out of a thermoplastic, for instance, can provide significant material and manufacturing cost-savings, as well as easier manufacturability, as compared to filter body housings made of aluminum. Additionally, thermoplastic polymers can have a lower density than aluminum, thereby substantially reducing the weight of the filter body housing.

The coefficient of thermal expansion (CTE) of certain thermoplastic polymers, however, may be substantially greater (e.g., at least about 10% greater) than the CTE of aluminum. A high CTE is undesirable because large temperature fluctuations in the environment surrounding the filter body housing can cause changes in the shape of the cavities in the body housing that are sufficient in size to alter the filtering frequency from its target value.

Filler materials can be mixed with the thermoplastic polymer to reduce the CTE of the composition. Some compositions of thermoplastic and filler material, however, can have an anisotropic CTE. That is, the CTE of the composition in one or more dimensions differ from another dimension. An anisotropic CTE can also cause undesirable changes in the filtering frequency. Additionally, the addition of a filler material having a density that is greater than that of the thermoplastic polymer increases the overall density of the thermoplastic polymer-filler material composition, thereby increasing the weight of the filter.

Figure 1A:
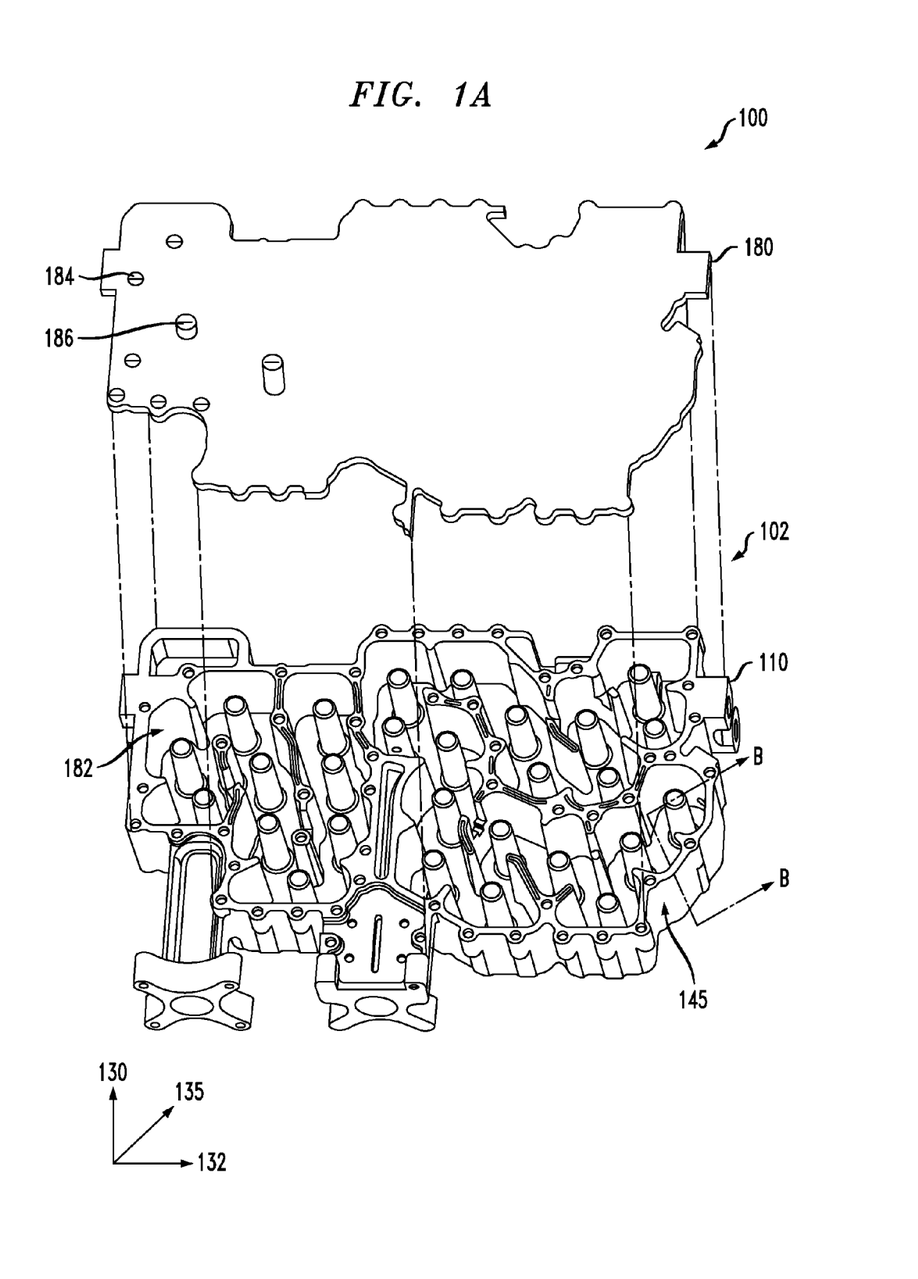
FIG. 1A presents a exploded perspective view of a portion of an example apparatus of the disclosure.
Figure 1B:
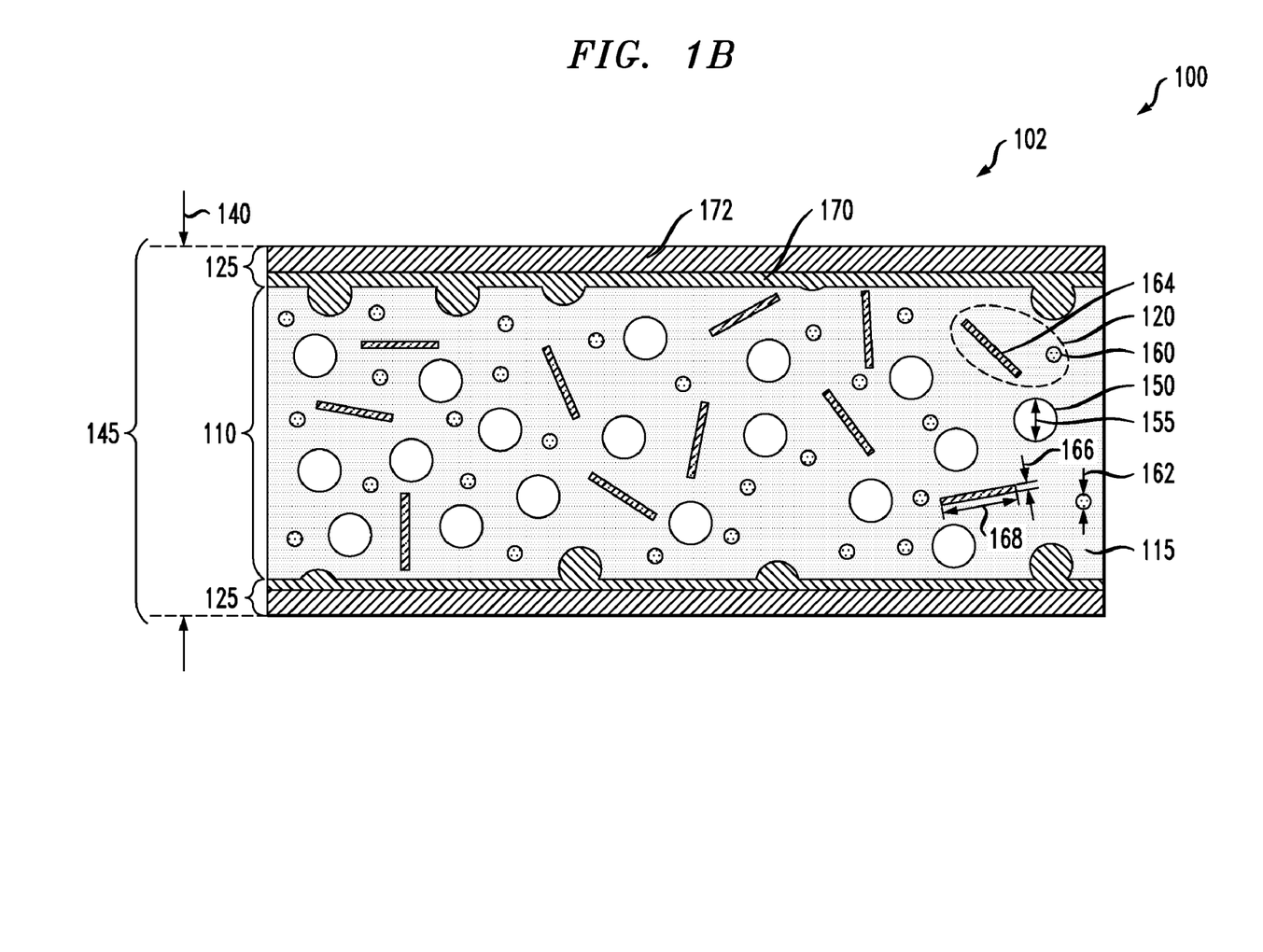
FIG. 1B presents a detailed cross-sectional view of a portion of the apparatus of FIG. 1A, along view line B-B.

One embodiment is an apparatus that comprises a radiofrequency filter body housing. FIG. 1A shows a perspective view of an example apparatus 100 and a radiofrequency filter body housing 102. FIG. 1B shows a cross-sectional detailed view of the housing 102 shown in FIG. 1A, along view line B-B.

In some embodiments, the apparatus 100 is configured as a wireless transmission system, and the radiofrequency filter body housing 102 is a component of the system. For instance, the radiofrequency filter body housing 102 can be part of an apparatus 100 configured as a tower-mounted amplifier filter in a mobile base station antenna mast. One of ordinary skill in the art would be familiar with the various shapes and additional components that the radiofrequency filter body housing 102 can have to facilitate filtering telecommunication signals in the microwave or radiofrequency frequency range.

Certain embodiments of the apparatus 100 address at least some of the above-described problems by providing a radiofrequency filter body housing 102 that includes a polymeric composition 110. The polymeric composition 110 includes at least one polymer foam 115 and filler material 120. The filler material 120 is uniformly distributed and randomly oriented throughout the polymeric composition 110. The radiofrequency filter body housing 102 further includes an electrically conductive material 125 coating the polymeric composition 110.

The term polymer, as used herein, refers to molecules with repeating units and having a molecular weight of about 1000 gm/mole or greater. The polymer can include polymer molecules of the same type (e.g., polymers or polymer distributions having the same repeating molecular formula), a blend of different types of polymers, or block copolymers of different polymer types. The polymer is preferably an amorphous polymer with no discernable crystalline structure because this is conducive to having an isotropic CTE. One of ordinary skill in the art would be familiar with the procedures used to determine whether or not a polymer is amorphous. For example, an x-ray powder pattern of an amorphous polymer would have no discernable peaks. The term polymer foam refers to polymers that include gas substantially dispersed in cells or pores distributed throughout the polymer. The polymer foam includes syntactic polymer foams.

The term uniformly distributed, as used herein, refers to filler material being distributed in the polymeric composition 110 such that the concentration of filler material does not substantially vary between different portions of the composition. For instance, in some embodiments of the polymeric composition, the concentration of filler material from any two different 1/10th or 1/4 volumes of the polymeric composition do not differ by more than about ±10 percent.

The term random orientation, as used herein, refers to the random orientation of the shape of the filler material in the composition. In cases where the filler material is symmetrically shaped (e.g., spherical) then the filler material inherently has a random orientation, since one side of the filler is substantially identical to any other side of the filler material. In cases where the filler material is asymmetrically shaped (e.g., fibers having a long and short axis), a random orientation refers to any one side of the filler material having substantially the same probability of facing one direction within the polymeric composition as in any another direction.

As noted above, mixing filler material with a polymer can help to lower the CTE of the composition. For instance, some preferred embodiments of the pure polymer used to form the polymer foam 115 have a CTE of about 100 ppm/° C. or less, and more preferably about 60 ppm/° C. or less. Examples include polyurethane, polyetherimide or epoxy resin. However, a composition 110 of polymer foams 115 that includes the filler material 120 can have a CTE that is reduced by about 20 to 80 percent as compared to the pure polymer.

Having a uniform distribution and random orientation of filler material 105 in the polymeric composition 110 facilitates the composition 110 having an isotropic CTE. In some preferred embodiments, the CTE of the composition 110 is substantially the same in all dimensions. In some preferred embodiments of the polymeric composition 110, for example, the extent of expansion for a given increase in temperature is about the same (e.g., about ±10 percent or less) in vertical 130, lateral 132 and depth 135 dimensions. In some preferred embodiments, the polymeric composition 110 has an isotropic CTE of about 36 ppm/° C. or less, and more preferably about 20 ppm/° C. or less, and even more preferably, about 15 ppm/° C. or less.

As also noted above, in some embodiments, it is desirable to minimize the weight of the radiofrequency filter body housing 102. Minimizing the weight of the body housing 102 is facilitated by using a low density polymeric composition. For instance, some preferred embodiments of the polymeric composition have a density of about 1.7 gm/cm$^3$ or less, and more preferably, about 1.2 gm/cm$^3$ or less, and even more preferably, about 0.7 gm/cm$^3$ or less.

In some preferred embodiments, the polymer foam 115 includes or is made of a low density polymer, as this helps to reduce the density of the polymeric composition. For instance, some embodiments of the pure polymer used to form the polymer foam 115 preferably have a density ranging from about 1.5 to 1 gm/cm$^3$. Examples include polyurethane, polyetherimide or epoxy resin.

Using a polymer foam 115 advantageously lowers the density of the polymeric composition to a value that is substantially less (e.g., about 20 to 80 percent less) than a polymeric composition that is made of a non-foamed polymer. For example, some embodiments of the polymeric composition include a polymer foam 115 having a density of about 0.7 gm/cm$^3$ or less, and more preferably, 0.5 gm/cm$^3$ or less.

In some embodiments of the polymer foam 115, the pore size or cell size is preferably substantially smaller (e.g., at least about 2 times smaller) than the smallest dimension of the body housing because this facilitates having a uniform body housing surface. Non-uniformities in the surface of the body housing can cause undesirable variations in the filtering frequency from one body housing to the next. Having substantially smaller pore or cell sizes is particularly important when the body housing is formed by machining a slab or block of polymer foam, and, consequently, some pores or cells of the polymer foam are exposed on the surface of the body housing.

Having substantially small pore or cell sizes can also improve the structural integrity of the body housing. For instance, if the cell or pore sizes of the polymer foam are equal to or greater than the smallest-dimensioned feature of the body housing, then the structural integrity of the body housing can be considerably weakened, or, there can be undesired openings between chambers of the body. An opening between chambers of the body, in turn, can cause undesirable variations in the filtering frequency from one manufactured body housing to the next.

Consider, for example, an embodiment of the body housing 102 where the polymer foam 115 is a closed-cell polymer foam and the smallest dimensional feature of the body housing 102 is the width 140 of a wall 145. FIG. 1B depicts an example polymer foam 115 having closed cells 150, each with a diameter 155. One skilled in the art would understand how the cells could range from substantially spherical to irregular shapes. The closed cells 150 of polymer foam 115 preferably have an average diameter 155 that is at least about 2 times smaller, and more preferably about 10 times smaller, than the smallest dimension (e.g., the width 140) of the body housing 102. For example, when the wall's width 140 equals about 5 millimeters, the closed cell's average diameter 155 preferably equals about 2.5 millimeters or less, and more preferably, about 250 microns or less. Similar considerations apply to the pore size (e.g., average diameter) of a polymer foam 115 that is an open-celled polymer foam.

For similar reasons of providing a uniform body housing surface and improving the structural integrity of the body housing, it can be desirable for the individual filler materials 120 to be substantially smaller (e.g., at least about 2 times smaller) than the smallest-dimensioned feature of the body housing 102. For instance, in some embodiment, it is desirable for the filler material 120 to have an average diameter that is less (e.g., at least about 2 times less, and more preferably, at least about 10 times less) than an average pore or cell diameter in the polymer foam 115.

In some preferred embodiments, the polymer foam 115 is or includes a thermoset polymer. In some cases the use of a thermoset polymer is conducive to having the filler material 120 uniformly distributed and randomly oriented because the polymer foam 115 can be formed from the polymerization of low molecular weight (e.g., about 1000 gm/mole or lower) precursors in the presence of the filler material 120. The precursors of the thermoset polymer 115 are low molecular weight, and therefore low viscosity. Mixing the thermoset polymer precursors with the filler material prior to polymerization and foaming facilitates a more uniform and random distribution of the filler material 120 and polymer molecules of the polymer foam 115 in the polymeric composition 102. This can be advantageous over body housings formed by a process that includes mixing filler material with, e.g., a high molecular weight thermoplastic polymer and injecting this mixture into a die cavity. The latter process can cause the non-random alignment or distribution of filler material, or, the non-random alignment of the polymer molecules themselves, with the direction of flow of the mixture. This, in turn, can cause the body housing to have an anisotropic CTE.

Some preferred thermoset polymer foams 115 include epoxies or polyurethanes that can be mixed with filler material and formed into a polymer foam to provide an isotropic low-CTE and low-density polymeric composites. A non-limiting example include a material-filled and closed-cell foamed epoxy polymeric composite comprising a syntactic polymer foam such as RenShape® 5008 (Huntsman Advanced Materials America, Auburn Hills, Mich.), which has an isotropic CTE of about 32 ppm/° C. (−30 to 30° C.) and a density of about 0.7 gm/cm$^3$. Another example is a material-filled and closed-celled foamed polyurethane polymeric composite, such as produced using a Baydur®STR structural-foam reaction-injection-molding system (Bayer Material Science LLC, Pittsburgh, Pa.), which can have an isotropic CTE of about 14 ppm/° C. and a density of about 1.0 to 0.9 gm/cm$^3$ or lower.

In other preferred embodiments, however, the polymer foam 115 is or includes a thermoplastic polymer. To provide an isotropic low-CTE and low-density polymeric composite, it is desirable to provide a material-filled thermoplastic foam polymer such that the filler material is uniformly distributed and randomly oriented throughout. This can be facilitated by mixing thermoplastic polymer precursors with a filler material prior to polymerization and foaming. As a non-limiting example, a material-filled polyetherimide foam can formed into a polymeric composite, such as described in U.S. Pat. No. 4,980,389 which is incorporated by reference in its entirety herein.

One of ordinary skill in the art would appreciate how other types of thermoset and thermoplastic polymer foams 115 could be used to form the polymeric composition 110.

The choice of filler material type and amount added are carefully selected to balance several different factors. The desirability of selecting filler material 120 having a substantially smaller size than the smallest-dimensioned feature of the body housing 102, or, the polymer foam's cell or pore size, has already been discussed. A low-cost filler material 120 is also desirable. The filler material 120 preferably has a lower CTE than that of the pure polymer used to form the polymer foam 115 so that its inclusion lowers the CTE of the polymeric composition 110. Additionally, to facilitate uniform dispersal in the polymer, it is desirable in some embodiments, for the filler material 120 to have a low interfacial surface energy between the filler material and the polymer or polymer precursors. The filler material 120 may inherently have such a low interfacial surface energy, or, may be surface-treated to provide such a low interfacial surface energy. One skilled in the art would understand how to perform such surface treatments.

The filler material 120 is different from other materials that may be added to the polymeric composition 110. Such other materials are added mainly for purposes other than reducing the CTE. Examples include colorants, flow thickeners, hardeners, surfactants, or other materials well-known to those skilled in the art. Still other additives to the polymer can include adhesion promoters for filler particles, mold release agents and mold coatings.

The amounts of filler material 120 added to the polymeric composition 110 can depend upon balancing multiple factors. Examples of such factors include having a compatible surface energy with the polymer 115, cost, and the CTE of the material. In some embodiments, for instance, a content of the filler material 120 in the polymeric composition 110 ranges from about 5 to 50 weight percent of the polymeric composition 110. The filler material 120 can include one or more types of fibers, particles, or, mixtures of fiber and particles. FIG. 1B depicts an example polymer foam 115 having particle 160 of a diameter 162, and, fibers 164 having a short axis 166 and a long axis 168. When the fibers 164 are substantially cylindrically-shaped, the short axis 166 is equal to a diameter of the fibers 164.

Substantially spherical particles 162 have an advantage of being symmetrical in shape, which can be conducive to providing the polymeric composition 110 with an isotropic and low CTE. In some preferred embodiments, the filler material 120 includes one or more types of particles 160 having an average diameter 162 ranging from about 1 to 500 microns. Some preferred particle types include: aluminum trihydrate, boron nitrate, titanium oxide, calcium carbonate, talc, glass, sand, alumina, clay, wood, or gypsum. One skilled in the art would be familiar with other types of mineral particles that could be used as the filler material 120.

Fibers 164 can have an advantage over particles 162 of providing a greater reduction in CTE per unit weight added, as compared to substantially spherical particles. Fibers 164, however, are sometimes more prone to introducing CTE anisotropy into the polymeric composition 110 because the long axis 168 of the fibers 164 has a tendency to align with the direction of flow of the polymer used to form the polymer foam 115, e.g., when being injected into a mold. In some preferred embodiments, the filler material 120 includes glass fibers 164. For example the fibers 164 can be continuous strand, chopped, or milled glass fibers. In some preferred embodiments, the fibers 164 have an average short axis 166 length ranging from about 10 to 200 microns, and an average long axis 168 length ranging from about 200 to 4000 microns, wherein a ratio of the long axis to the short axis ranges from about 5:1 to 20:1.

In some preferred embodiments, the electrically conductive material 125 coating the polymeric composition 110 125 includes silver, or other metals having a similar high electrical conductivity. In some cases the conductive material includes an underlying metal layer 170 and outer metal layer 172. The underlying metal layer 170 (e.g., copper) can facilitate adhesion of the outer metal layer 172 (e.g., silver) to the polymeric composition 110, when the outer metal layer 172 has poor direct adhesion to the polymeric composition 110.

In some embodiments, a polymeric composition 110 that includes an epoxy polymer foam 115 is preferred because the conductive material 125 can be more readily plated onto such a polymeric composition 110, than certain polymeric composition 110 made of thermoplastic polymers. Moreover, epoxy-containing polymeric compositions 110 are more amendable to having other components being soldered to the body housing 102 than certain polymeric composition 110 made of thermoplastic polymers. For instance an epoxy polymer has more surface functional groups to which a metal seed layer can be bonded to as compared to, e.g., thermoplastics such as polyetherimide or polypropylene or polyethylene.

In addition to providing electrical conductivity, the metal layers 170, 172 help to smooth out the surface of the polymeric composition 110. For instance, one or both of the metal layers 170, 172 can fill open cells 174 of a foamed polymer 115, that became exposed during the machining of a block or slab of the polymeric composition 110 to form the body housing 102.

The radiofrequency filter body housing 102 can include other components to provide a functional radiofrequency filter. For instance, the body housing 102 can further include a cover plate 180 that encloses resonating cavities 182 of the body housing 102 (FIG. 1A).

In some cases, the cover plate 180 is composed of a solid metal such as aluminum. In other cases, the plate 180 is composed of the polymeric composition and electrically conductive material coating the polymeric composition, such as used for the body housing 102. Using the same polymeric composition can advantageously reduce the weight of the plate 180 and provide the same isotropic CTE as the body housing 102.

In some embodiments, fastening structures 184 (e.g., screws, nails, bolts) are used to secure the cover plate 180 to the body housing 102. However, other securing mechanisms such as solder can be used, if desired. In some embodiments, tuning rods 186 are attached to the plate 180 or body housing 102. The tuning rods 186 can be configured to be adjustably inserted into the cavities 182 to thereby tune the resonance frequency of the radiofrequency filter body housing 102. For instance in some embodiment the tuning rods are screwed through the plate 180 and into the cavities 182 so as to tune the resonance of the body housing 102 to a particular target value (e.g., 700 MHz). One skilled in the art would be familiar with other components that the body housing 102 could have to facilitate its operation.

Figure 2:
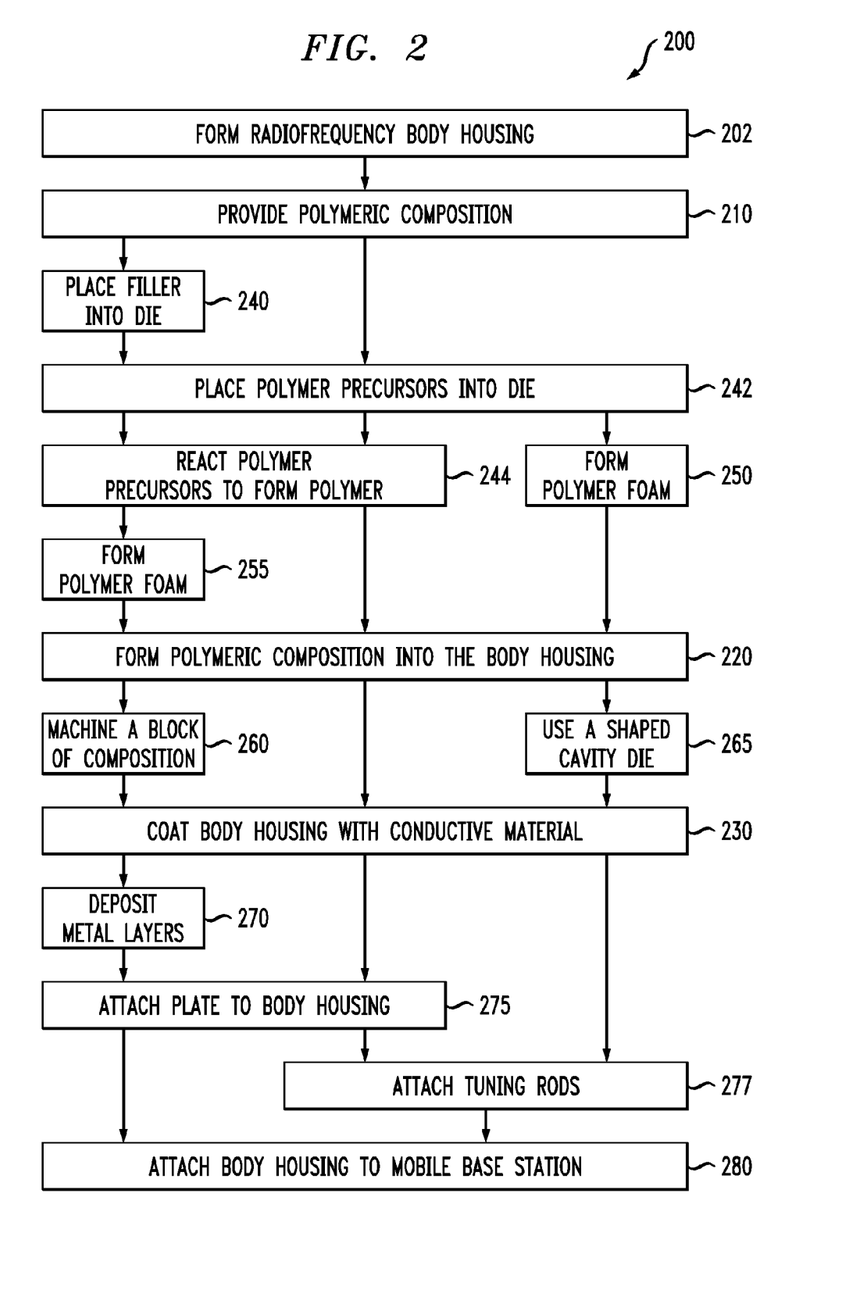
FIG. 2 presents a flow diagram of selected steps in an example method of manufacturing an apparatus, e.g., as in FIG. 1A.

Another embodiment is a method of manufacturing an apparatus. Any of the embodiments of the apparatus described herein can be manufactured by the method. For instance, in some preferred embodiments the apparatus manufactured is a wireless transmission system. FIG. 2 presents a flow diagram of selected steps in an example method 200 of manufacturing an apparatus, such as shown in FIG. 1A.

The method 200 includes a step 202 of forming a radiofrequency filter body housing that includes providing, in step 210, a polymeric composition. As discussed above in the context of FIGS. 1A and 1B, the polymeric composition includes at least one polymer and filler material, the filler material being uniformly distributed and randomly oriented throughout the at least one polymer. The method further includes forming the polymer composition into a body housing in step 220, and coating the body housing with an electrically conductive material in step 230.

In some embodiments, providing the polymeric composition (step 210) includes a step 240 of placing filler material into the cavity die, a step 242 of placing polymer precursors into a cavity die and a step 244 of reacting the polymer precursors (e.g., thermoset or thermoplastic polymer precursors) to form the polymer in the die.

In some preferred embodiments, the filler material (e.g., particles, fibers, or both) is placed in the cavity die (step 240) and then low-molecular weight polymer precursors are flowed (e.g., thermoplastic or thermoset monomers in a liquid form) into the cavity die (step 242) such that the polymer precursors infiltrate throughout the filler material. After the polymer precursors have infiltrated the filler material, the polymer precursors are polymerized to form the polymer (step 244), thereby resulting in the formation of the polymeric composition (step 210). The above sequence of process steps can facilitate the more uniform distribution and random orientation of the filler material, and increase filler concentrations. For instance, there can be reduced alignment of certain filler material (e.g., fibers) with the shear direction of the flow of the polymer precursors into the cavity die by placing the filler material into the cavity die before flowing the polymer precursors into the cavity die.

In other embodiments, however, both the filler material and polymer precursors can be placed into a cavity die at the same time in steps 240, 242, respectively. For instance, the filler material and powder forms of polymer precursors can be placed into the cavity die in steps 240, 242 so as to be uniformly and randomly distributed throughout the die. Then the polymer precursors can be polymerized to form the polymer in step 244. As an example, powders of polyetherimide precursors such as described in U.S. Pat. No. 4,980,389, and filler material, can be placed into a cavity die in steps 240, 242, and then heated in step 244 to form the polymer.

Or, the filler material and liquid polymer precursors can be simultaneously placed in the cavity die in steps 240, 242 by a reaction-injection molding process. The polymer precursor can then be polymerized in step 244 after closing and heating the die. For example, in some preferred embodiments polyurethane precursors (e.g., diisocyanate and polyol) are sprayed into the die using a spray head that simultaneously mixes polyurethane precursors and chops filler material comprising glass fibers into the appropriate size. Such an approach advantageously avoids or reduces viscous or viscoelastic material flow. Viscous or viscoelastic material flow can cause flow-induced particle orientation and non-uniform distribution, such as found in certain injection molding processes using high-molecular weight thermoplastics.

One skilled in the art would be familiar with other molding processes, such as transfer molding processes, which could be used. For example, low molecular weight epoxy precursors can be mixed with filler material comprising silica particles (e.g., spherical quartz) at an elevated temperature to melt the precursors and then transferred into a heated mold where the precursors react to form a thermoset polymer.

In some embodiments, providing the polymeric composition (step 210) further includes a step 250 of forming polymer foam in a cavity die that holds the polymer precursors and the filler material. For instance, the reaction step 244 to form the polymer can further include a step 250 of forming the polymer foam. The foam formed in step 250 can be simultaneous with the reaction step 244 to form the polymer. As an example, heating the polyetherimide precursors such as described in U.S. Pat. No. 4,980,389 can produce a foam. Or, excess isocyanate groups in a forming polyurethane polymer can react with water in the cavity die to form carbon dioxide, which in turn, acts as a foaming agent. In still other cases foaming agents such as low-boiling-point inert liquids (e.g., trichlorfluoromethane), can be used as the foaming agent. As another example, a foaming agent such as azodicarbonamide can be added as a powder to the polymer precursor or polymer mixture. Upon heating (e.g., about 200° C.) the foaming agent decomposes to form more gases (e.g., nitrogen and/or other gases including ammonia) that form the cells of the polymer foam.

In still other embodiments, however, the polymer foam can be formed in a step 255 that occurs substantially late in, or after, the reaction step 244 to form the polymer. For example, the polymer can be formed in the cavity die, at an elevated pressure, in the presence of a foaming agent (e.g., nitrogen gas) and then extruded from the die to form the polymer foam. In yet other embodiments, hollow particles (e.g., micron-size balloons) can be added to the polymer precursor or polymer mixture to form the polymer foam. In some cases, the filler material includes hollow particles having a substantially lower density (e.g., about 20 to 80 percent) than the density of the polymer. As an example, any of the above-described processes can be used to include micron-size balloons and filler material pre-polymer reactants that are uniformly distributed in a cavity die and then the pre-polymer reactants polymerized to form the polymer foam. Embodiments of the polymer foam can also include polymer foams formed through a combination of above-described processes. For instance, the cells of the polymer foam can comprise cells formed both from hollow particles and the gases of foaming agents.

In some embodiments, forming the body housing (step 220) includes a step 260 of machining a block of the polymeric composition into a target shape of the body housing. Machining is desirable when the polymeric composition is formed in a shape that is not the same as the target shape of the body housing. Machining a block of the polymeric composition into a target shape is also advantageous when there can be substantial shrinkage of the polymeric composition during its formation. For instance, certain polymeric compositions that include polyetherimide can undergo asymmetric shrinkage, e.g., due to cooling after forming the polymer foam via injection or compression molding in a shaped cavity die. Shrinkage can undesirably alter the shaped polymeric composition away from the target shape of the body housing.

When machining the polymeric composition into its target shape, the cavity die can be block-shaped, or the polymeric composition can be extruded from the die as a block-shaped member. In either instance, any shrinkage has already occurred before machining commences and therefore, the above concerns are ameliorated. In some preferred embodiments, a block of polymeric composition can be machined using a commercial computer-numerical control device. Machining a polymeric composition can be substantially easier than machining aluminum and can eliminate the need for expensive tooling. Moreover, machining can provide a cost-effective approach for manufacturing small numbers (e.g., 100s or less) of body housings. Additionally, the computer-numerical control device can be easily re-programmed to manufacture different shapes of body housing for specific frequency-filtering applications. One skilled in the art would be familiar with other forms of machining or milling that could be used to shape the polymeric composition into the body housing.

In other embodiments, forming the body housing (step 220) includes a step 265 of placing polymer precursors and filler particles into a shaped cavity die, that is, a die that has an inverse shape of the target shape of the body housing. The polymer precursors and other materials are then reacted in accordance with step 244 to form the polymer foam of the polymeric composition. An advantage of using such a cavity die is that further machining or shaping of the polymeric foam composition to form the body housing can be eliminated.

Placing the polymer precursors and the filler particles into a shaped cavity die such that the filler particles will be uniformly distributed in the polymeric composition also helps to promote isotropic shrinkage when the polymeric composition cools. This, in turn, helps to avoid undesirable changes in the shape of the polymeric composition form its target shape. In some embodiments, shrinkage can be further minimized by using a thermoset polymer foam to make the polymeric composition. Shrinkage can be less in thermoset polymers than for thermoplastic polymers because the former can have a greater degrees of cross-linking between individual polymer molecules or within individual molecules at elevated temperatures, thereby setting or locking-in the three-dimensional shape at a higher temperature. The high degree of cross-linking in the thermoset polymer, in turn, helps to minimize shrinkage when the polymeric composition cools.

In some embodiments, coating the body housing with an electrically conductive material in step 230, includes depositing (step 270) the body housing with successive layers of metal (e.g., copper and silver). For instance, electroless or electrolytic plating processes, or, a combination of both, can be used to coat the entire surface of the body housing with such electrically conductive materials. In some embodiments, a metal seed layer is formed to facilitate the deposition of the metal layers. For example, a seed layer comprising a catalyst to facilitate electroless plating can be deposited on the surface of the polymer foam. The seed layer does not have to be a continuous layer. Some embodiments of the seed layer include a metal salt (e.g., a palladium salt). The seed layer can be bonded to the polymer foam mechanically, by forming pores, or chemically via chemical sites on the surface of the polymer. For instance, the surface of epoxy polymers has many functional groups to facilitate chemical attachment of the seed layer.

In some embodiments, the filler material in the polymer foam can be pre-coated with metal to enhance the initiation of electroplating. For instance, at least some of the particles or fibers of the filler material mixed with the polymer or polymer precursor can have a copper layer deposited via chemical vapor deposition. One of original skill in the art would be familiar with other metal coating processes. Such metal-coated particles that are exposed on the surface of the polymer can help catalyze the electroless deposition of copper without the addition of a seed layer, although a seed layer can still be used, if desired. Sufficient quantities of such conductive particles can form through-going conductive chains of particles which can facilitate electrolytic plating. For example, an electrode can be attached to the molding polymer foam surface and plated with metal without first going through an electroless deposition step.

In other cases, conventional techniques such as spraying or painting could also be used to coat the housing in step 230.

Other steps to complete the manufacture of the body housing (step 202) can include attaching a plate in step 275 to the body housing, such that the cavities of the body housing are enclosed by the plate and the walls of the body housing. Attaching the plate can include screwing, nailing or bolting the plate to the body housing, or, soldering the plate to the body housing. The manufacture of the body housing (step 202) can include attaching tuning rods to the body housing or plate (step 277), for example, by screwing, or, otherwise adjustably attaching the tuning rods, into the plate or the body housing.

One skilled in the art would be familiar with other steps in the manufacture of the apparatus, depending on the apparatus's particular configuration. For instance, when the apparatus is a wireless transmission system, the method 200 can include attaching (step 280) the radiofrequency filter body housing to a mobile base station antenna mast.

Although the embodiments have been described in detail, those of ordinary skill in the art should understand that they could make various changes, substitutions and alterations herein without departing from the scope of the disclosure.

What is claimed is:

1. An apparatus, comprising: a radiofrequency filter body housing, said filter body housing including: a polymeric composition that includes at least one polymer foam and filler material, said filler material being uniformly distributed and randomly oriented throughout said polymeric composition; and an electrically conductive material coating said polymeric composition, and wherein at least some individual fibers or particles of said filler material are pre-coated with a metal coating.

2. The apparatus of claim 1, wherein said polymeric composition has an isotropic coefficient of thermal expansion of about 36 ppm/° C. or less.

3. The apparatus of claim 1, wherein said polymeric composition has a density of less than about 1.7 gm/cm$^3$.

4. The apparatus of claim 1, wherein said polymer foam is a closed cell foam.

5. The apparatus of claim 1, wherein said polymer foam has pores or closed cells that have an average diameter that is at least 2 times smaller than a smallest-dimensioned feature of said body housing.

6. The apparatus of claim 1, wherein said filler material has an average diameter that is less than an average pore or cell diameter in said polymer foam.

7. The apparatus of claim 1, wherein said at least one polymer is or includes a thermoset polymer.

8. The apparatus of claim 7, wherein said thermoset polymer includes one or more of an epoxy thermoset polymer or a polyurethane thermoset polymer.

9. The apparatus of claim 1, wherein a content of said filler material in said polymeric composition ranges from about 5 to 50 weight percent of said polymeric composition.

10. The apparatus of claim 1, wherein said filler material includes one or more of fibers or particles.

11. The apparatus of claim 1, wherein said radiofrequency filter body housing is a component of a wireless transmission system.

12. The apparatus of claim 1, wherein said polymer foam is a syntactic polymer foam.

13. A method for manufacturing an apparatus, comprising: forming a radiofrequency filter body housing, including: providing a polymeric composition that includes at least one polymer foam and filler material, said filler material being uniformly distributed and randomly oriented throughout said polymer and wherein providing a polymeric composition including pre-coating at least some individual fibers or particles of said filler material with metal; forming said polymeric composition into a body housing; and coating said body housing with an electrically conductive material.

14. The method of claim 13, wherein coating said body housing includes plating said body housing with successive layers of copper and silver.

15. The method of claim 13, wherein providing said polymeric composition includes placing polymer precursors and said filler material into a cavity die, and reacting said polymer precursors to form said polymer.

16. The method of claim 13, wherein providing said polymeric composition includes forming said polymer foam in a cavity die holding polymer precursors and said filler material.

17. The method of claim 13, wherein providing said polymeric composition includes forming said polymer foam in a cavity die holding said polymer and said filler material.

18. The method of claim 13, wherein forming said body housing includes machining a block of said polymeric composition into a target shape of said body housing.

19. A method for manufacturing an apparatus, comprising:
forming a radiofrequency filter body housing, including:
providing a polymeric composition that includes at least one polymer foam and filler material, said filler material being uniformly distributed and randomly oriented throughout said polymer;
forming said polymeric composition into a body housing; and
coating said body housing with an electrically conductive material, wherein forming said body housing includes placing polymer precursors and said filler material into a cavity die having an inverse shape of a target shape of said body housing.

\* \* \* \* \*